Aug. 26, 1947.    R. G. WILSON    2,426,382
MILLING CUTTER
Filed June 23, 1944

INVENTOR.
RAYMOND G. WILSON,
BY
ATTORNEYS.

Patented Aug. 26, 1947

2,426,382

UNITED STATES PATENT OFFICE 2,426,382

MILLING CUTTER

Raymond G. Wilson, Indianapolis, Ind.

Application June 23, 1944, Serial No. 541,785

5 Claims. (Cl. 29—105)

My invention relates to a face milling cutter provided with axially extending, replaceable teeth or bits. It is the object of my invention to produce a cutter of this kind in which the radial position of each tooth can be varied, thus permitting the teeth to be sharpened individually prior to their insertion in the cutter body and, after insertion, to be adjusted radially so that the cutting edges of each circumferential series of teeth will be at a uniform distance from the axis of the cutter. A further object of my invention is to provide an inserted-tooth face cutter with means for adjusting the radial position of the teeth, which means will be readily accessible without constituting an operational hazard. Still another object of my invention is to provide a cutter with tooth-adjusting means which will not require access from the periphery of the cutter.

In carrying out my invention, I employ a cutter body adapted centrally for attachment to a milling-machine spindle or similar rotating element and provided with a circumferential series of radially projecting arms. These arms are provided with slots extending through them and adapted respectively to receive replaceable teeth disposed parallel to the axis of the cutter-body. At least one of the radially presented faces of each slot is inclined to the cutter-axis, and between such face and the associated tooth I provide a wedge. By axial adjustment of such wedge it is possible to vary the radial disposition of the tooth in contact with it. Clamp means are provided for securing each wedge and tooth after the adjustment of the tooth to the proper radial position has been accomplished.

Figure 1:
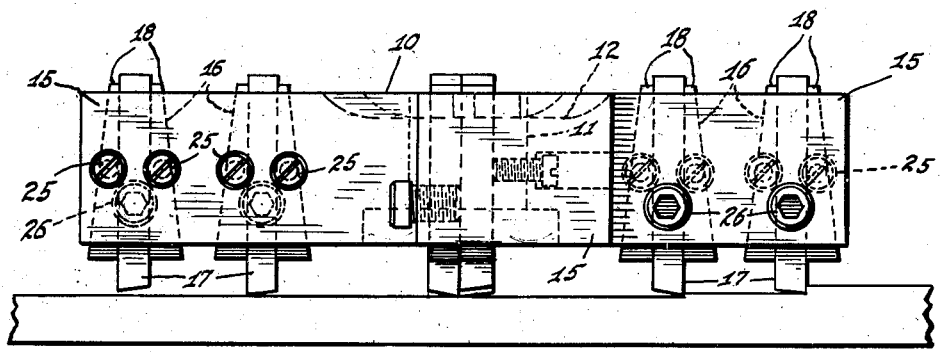
Figure 2:
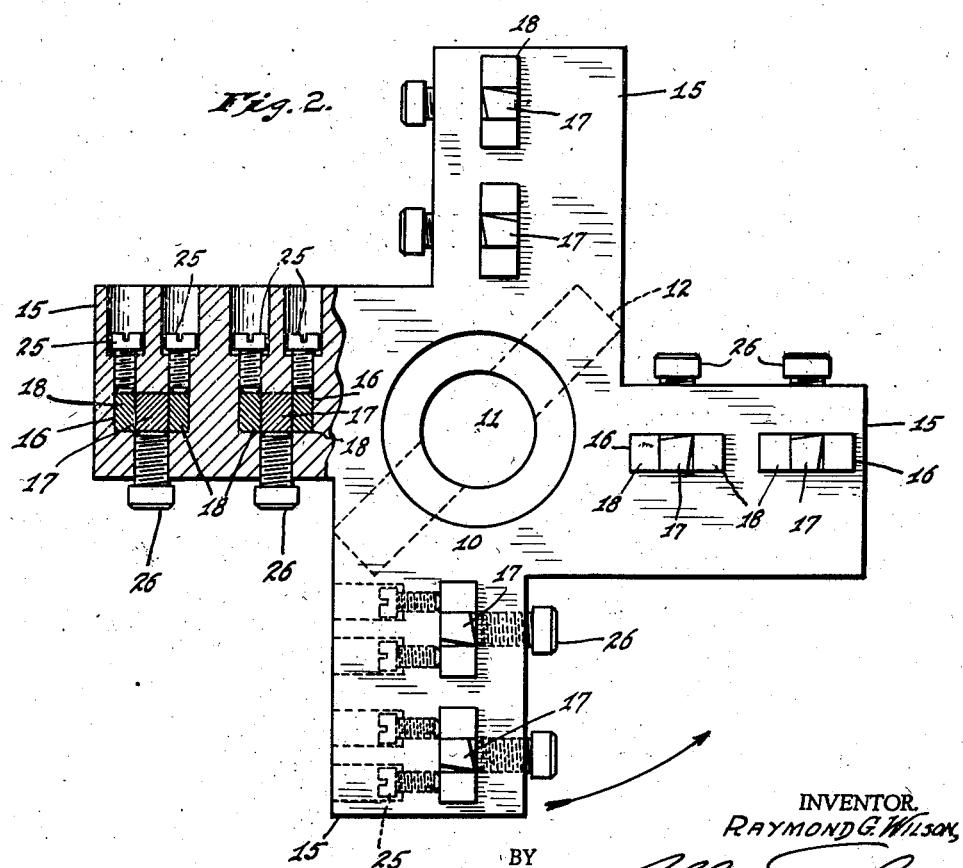

The accompanying drawing illustrates my invention, Figs. 1 and 2 being respectively a side elevation and an end elevation of a face cutter.

The cutter shown in the drawing embodies a body 10 provided with a central bore 11 adapted to receive an adapter or arbor (not shown) by which the cutter is adapted to be secured to a milling-machine spindle. A diametrical groove 12 may be provided in the body to accommodate driving lugs, with which adapters are commonly provided. Projecting radially outward from the central portion of the body 10 are a series of equally spaced arms 15, here shown as four in number. The arms 15 are provided with slots 16 each adapted to receive a replaceable bit or tooth 17 disposed parallel to the cutter-axis. As shown, each arm is provided with two tooth-receiving slots 16, since the cutter of the drawing is intended to possess two circumferential series of teeth, an outer series for roughing and an inner series for finishing.

The opposite radially presented faces of each slot 16—i. e., those faces perpendicular to the axial plane of the slot—are at an angle to each other and to the cutter axis, and the narrowest part of the slot in a radial direction has a width considerably greater than the radial width of the associated tooth. In a tangential direction, the width of the slot conforms substantially to the width of the tool. As a result, each tool, while confined closely to a single radial plane, is movable axially and radially of the cutter.

To provide for locating each tool 17 radially in its associated slot I dispose on opposite sides thereof wedges 18 each tapered complementarily to the axial inclination of the adjacent side of the slot 16. As shown, the radially presented sides of each slot are inclined oppositely to the axis so that the slot is wider at one end than at the other and the wedges 18 both have their large ends extending in the same direction. This, however, is not essential. In fact, it is not essential that there be two wedges associated with each tooth, as the chief purpose of the wedges is merely to provide a means for locating the teeth radially, and other means, later described, are employed to secure the teeth once their respective radial positions are determined.

In the particular construction shown in the drawing radial adjustment of each tooth is effected by opposite axial movement of the two wedges associated with such tooth. Thus to move a tooth outwardly in the cutter body, the wedge on the outside of such tooth is moved downwardly (Fig. 1) and the wedge on the inside is moved upwardly. To facilitate adjustment of the wedges each is desirably provided with a brake means lightly opposing its longitudinal movement. As shown, this brake means takes the form of a screw 25 mounted in the arm 15 in a position such that its inner end may project into the slot 16 adjacent an inclined face thereof for engagement with one of the parallel faces of the associated wedge 18. The screws 25 are desirably of some relatively soft metal, such as brass, so that by tightening them slightly a light frictional load will be imposed on the wedges. This light load is desirable in effecting adjustment of the wedges to locate the associated tools in proper radial position. After each wedge has been properly located the associated screw 25 is tightened securely.

In that face of the arm opposite the screws 25 set screws 26 are mounted in positions such that their ends may bear respectively against the teeth 17 and secure them in place. Desirably, the set screws 26 are located on the forward faces of the arms 15 and the screws 25 on the rear faces of such arms.

I contemplate that the several teeth 17 embodied in my cutter will be individually sharpened while removed from the cutter body. This sharpening may, and usually will, be done by hand with the result that there will be some variation in the disposition of the cutting edges of the teeth relative to the side faces which locate the teeth in the cutter body. Such variation is immaterial in a cutter embodying my invention, since the possibility of tooth adjustment permits each cutting edge to be brought into proper position.

After the teeth 17 have been sharpened, they are placed in the respective slots 16 in approximately the correct positions. The clamp screws 25 are tightened slightly to create a slight frictional drag opposing movement of the wedges. The screws 26, acting directly on the teeth, are loosened at least to the extent that they do not interfere with tooth movement. By supporting the head in a suitable fixture for rotation about its axis, or by mounting it on the machine in which it is to be used, and by applying an indicator to the cutting edges of the teeth of each circumferential series as the cutter is rotated, it is possible to determine the relative radial dispositions of the several cutting edges. By movement of the wedges associated with each tooth, the radial dispositions of the respective teeth can be varied in the manner previously set forth and the cutting edges of each series of teeth placed at a uniform distance from the cutter axis. When this condition has been attained, the clamp screws 25 are tightened to secure the wedges 18 in place. As long as the location of the wedges is not changed each tooth is confined to movement parallel to itself and to the cutter axis; and the teeth can then be adjusted longitudinally of themselves to bring the tips of the teeth of each series into a common plane perpendicular to the cutter-axis. The cutter will then be ready for use.

In the cutter shown in the drawing, it is intended that the inner series of teeth will take a finishing cut on the work while the outer series of teeth will take a roughing cut. The teeth of the inner series therefore project axially beyond the teeth of the outer series by a distance equal to the depth of the finishing cut. In order to avoid limitations on the width of the finishing cut, which cannot exceed the diameter of the circle in which the cutting edges of the inner teeth are located, it is desirable that the inner teeth be disposed as close as conveniently possible to the outer teeth. With a close spacing of inner and outer teeth it would be difficult to sharpen the inner teeth while they are in place in the cutter body; and moreover the operation of sharpening the teeth in place would require a relatively complicated fixture and comparatively skilled workmanship. My invention is especially valuable, therefore, in cutters provided with two or more series of cutting teeth.

It is to be noted that all the adjusting and tooth-securing means embodied in my cutter are located within the periphery of the cutter body and are accessible at the sides of the arms 15. The former feature conserves space and makes for safety of operation while the latter greatly facilitates the inclusion of two series of teeth.

I claim as my invention:

1. A face milling cutter, comprising a body, a circumferential series of arms projecting radially from said body, an axially extending slot in each of said arms, a cutting tooth disposed in said slot and projecting in a general axial direction from the associated arm, said tool having a radial dimension less than that of said slot whereby the tool may be adjusted radially in the slot, means for adjusting the tool radially, and a clamp means for holding the tool in adjusted position, said clamp means acting tangentially on said tool and including a tangentially disposed clamp screw.

2. The invention set forth in claim 1 with the addition that said tool-adjusting means comprises a wedge disposed between the tool and a side of said slot and movable in a general axial direction.

3. A face milling cutter, comprising a body, a circumferential series of arms projecting radially from said body, an axially extending slot in each of said arms, a cutting tooth disposed in said slot and projecting in a general axial direction from the associated arm, said tool having a radial dimension less than that of said slot whereby the tool may be adjusted radially in the slot, said slot having a radially presented face inclined to the axis of the cutter body, an axially movable wedge disposed between such inclined slot-face and the tool, the taper of the wedge corresponding to the inclination of said slot-face whereby when one of the tapered faces of the wedge is in contact with said inclined slot-face the opposite face of the wedge will be parallel to the axis of the cutter, and clamp means acting on said tool in a direction parallel to said inclined slot-face.

4. A face milling cutter, comprising a body, a circumferential series of arms projecting radially from said body, an axially extending slot in each of said arms, said slot having opposite radially presented faces inclined oppositely to the axis of the cutter body, two wedges longitudinally movable in said slot in contact with said inclined faces and tapered to provide between them a space of uniform width, and a cutting tool located in such space and projecting axially from the associated arm.

5. A face milling cutter, comprising a body, a circumferential series of arms projecting radially from said body, an axially extending slot in each of said arms, said slot having opposite radially presented faces inclined to the axis of the cutter body, two wedges longitudinally movable in said slot in contact with said inclined faces and tapered to provide between them a space of uniform width, and a cutting tool located in such space and projecting axially from the associated arm.

RAYMOND G. WILSON.

REFERENCES CITED

The following references are of record in the file of this patent:

UNITED STATES PATENTS

| Number | Name | Date |
| --- | --- | --- |
| 1,411,390 | Tibbetts | Apr. 4, 1922 |
| 150,395 | Chapman | May 5, 1874 |
| 643,991 | Taylor | Feb. 20, 1900 |
| 1,195,774 | Brown | Aug. 22, 1916 |
| 1,274,466 | Stewart | Aug. 6, 1918 |
| 1,820,415 | Wildhaber | Aug. 25, 1931 |
| 1,825,733 | Johanson | Oct. 6, 1931 |
| 2,322,579 | Kutscha | June 22, 1943 |
| 2,344,509 | Guenther | Mar. 21, 1944 |
| 781,851 | Taylor et al. | Feb. 7, 1905 |
| 2,024,494 | Wildhaber | Dec. 17, 1935 |

FOREIGN PATENTS

| Number | Country | Date |
| --- | --- | --- |
| 355,580 | Great Britain | Aug. 27, 1931 |
| 537,399 | Great Britain | June 19, 1941 |